(12) United States Patent
Puniello et al.

(10) Patent No.: US 7,135,138 B2
(45) Date of Patent: Nov. 14, 2006

(54) RETRACTABLE PIN REACTION INJECTION MOLDING

(75) Inventors: Paul A. Puniello, Bristol, RI (US); Robert A. Wilson, Sagamore, MA (US)

(73) Assignee: Acushnet Company, Fairhaven, MA (US)

( * ) Notice: Subject to any disclaimer, the term of this patent is extended or adjusted under 35 U.S.C. 154(b) by 254 days.

(21) Appl. No.: 10/430,324

(22) Filed: May 7, 2003

(65) Prior Publication Data

US 2004/0222555 A1 Nov. 11, 2004

(51) Int. Cl.
*B29C 45/14* (2006.01)
(52) U.S. Cl. .................. 264/276; 264/278; 264/279; 264/279.1
(58) Field of Classification Search ............. 264/328.1, 264/275, 276, 277, 278, 279, 279.1, 572
See application file for complete search history.

(56) References Cited

U.S. PATENT DOCUMENTS

| | | | | |
|---|---|---|---|---|
| 2,361,348 A | * | 10/1944 | Dickson et al. ............. | 264/278 |
| 3,068,522 A | * | 12/1962 | Nickerson et al. .......... | 264/275 |
| 3,626,051 A | * | 12/1971 | Liautaud ................. | 264/272.19 |
| 4,318,874 A | * | 3/1982 | Lemelson .................. | 264/40.1 |
| 5,716,561 A | * | 2/1998 | Guergov ................... | 264/40.1 |
| 5,849,237 A | * | 12/1998 | Inoue ........................... | 264/319 |
| 5,879,599 A | * | 3/1999 | Inoue et al. ................ | 264/102 |
| 6,019,921 A | * | 2/2000 | Lutz ........................... | 264/129 |
| 6,129,881 A | * | 10/2000 | Puniello ..................... | 264/278 |
| 6,235,230 B1 | | 5/2001 | Puniello ..................... | 264/278 |
| 6,290,614 B1 | | 9/2001 | Kennedy, III et al. ...... | 473/378 |
| 6,379,138 B1 | | 4/2002 | Puniello et al. ............. | 425/116 |
| 6,533,566 B1 | * | 3/2003 | Tzivanis et al. ............ | 425/116 |
| 6,776,942 B1 | * | 8/2004 | Kim ........................... | 264/102 |
| 6,787,091 B1 | * | 9/2004 | Dalton et al. ................ | 264/260 |
| 2002/0016435 A1 | | 2/2002 | Simonutti et al. ............ | 528/59 |
| 2002/0173379 A1 | | 11/2002 | Wu et al. ................... | 473/371 |
| 2005/0098925 A1 | * | 5/2005 | Puniello et al. .......... | 264/328.1 |

* cited by examiner

*Primary Examiner*—Jill L. Heitbrink
(74) *Attorney, Agent, or Firm*—Bingham McCutchen LLP

(57) ABSTRACT

A retractable pin reaction injection molding device and method for forming a layer on an object are disclosed and claimed. The device includes mold plates that cooperate to form a cavity. Retractable pins hold the object within the cavity. Material is inserted into the cavity under pressure to form a layer on the object. The pins are retracted and material fills the voids left by the retracted pins. A system prevents the material from flowing into the clearance between the pins and the mold plates. The system provides a counter pressure of a non-reacting gas to resist the material insertion pressure. The counter pressure may also be used to balance and control the material injection into the mold. Suitable materials for use with the apparatus and method are also disclosed.

15 Claims, 2 Drawing Sheets

RETRACTABLE PIN REACTION INJECTION MOLDING

BACKGROUND OF THE INVENTION

1. Field of the Invention

The present invention relates to a device and method for reaction injection molding. More specifically, the present invention relates to device and method for reaction injection molding while allowing for the use of retractable pins. Still more specifically, the present invention relates to a device and method for forming a layer on a golf ball using retractable pins by reaction injection molding.

2. Description of the Related Art

The covers of today's golf balls are made from a variety of materials, such as balata, SURLYN®, and IOTEK®. Balata is a natural or synthetic trans-polyisoprene rubber. Balata covered balls are favored by more highly skilled golfers because the softness of the cover allows the player to achieve spin rates sufficient to more precisely control ball direction and distance, particularly on shorter shots. Balata-covered balls, however, are easily damaged, and thus lack the durability required by the average golfer. Accordingly, alternative cover compositions have been developed in an attempt to provide balls with spin rates and a feel approaching those of balata-covered balls, while also providing higher durability and overall distance.

Ionomer resins have, to a large extent, replaced balata as a cover material. Chemically, ionomer resins are a copolymer of an olefin and an $\alpha$, $\beta$-ethylenically-unsaturated carboxylic acid having 10 to 90 percent of the carboxylic acid groups neutralized by a metal ion, as disclosed in U.S. Pat. No. 3,264,272. Commercially available ionomer resins include, for example, copolymers of ethylene and methacrylic or acrylic acid, neutralized with metal salts. Examples of commercially available ionomer resins include, but are not limited to, SURLYN® from DuPont de Nemours and Company, and ESCOR® and IOTEK® from Exxon Corporation. These ionomer resins are distinguished by the type of metal ion, the amount of acid, and the degree of neutralization. However, while ionomer-covered golf balls possess virtually cut-proof covers, the spin and feel are inferior compared to balata-covered balls.

Polyurethanes have also been recognized as useful materials for golf ball covers since about 1960. The resulting golf balls are durable and, unlike ionomer-covered golf balls, polyurethane golf ball covers can be formulated to possess the soft "feel" of balata-covered golf balls. U.S. Pat. No. 4,123,061 teaches a golf ball made from a polyurethane prepolymer formed of polyether with diisocyanate that is cured with either a polyol or an amine-type curing agent. U.S. Pat. No. 5,334,673 discloses the use of two categories of polyurethane available on the market, i.e., thermoset and thermoplastic polyurethanes, for forming golf ball covers and, in particular, thermoset polyurethane-covered golf balls made from a composition of polyurethane prepolymer and a slow-reacting amine curing agent, and/or a difunctional glycol.

Polyureas have also been proposed as cover materials for golf balls. For instance, U.S. Pat. No. 5,484,870 discloses a polyurea composition comprising the reaction product of an organic diisocyanate and an organic amine, each having at least two functional groups. Once these two ingredients are combined, the polyurea is formed, and thus the ability to vary the physical properties of the composition is limited.

Conventionally, golf balls are made by molding a cover around a core. The core may be wound or solid. A wound core typically comprises elastic thread wound about a solid or liquid center. Solid cores typically comprise a single solid piece center or a solid center covered by one or more mantle or boundary layers of material. Wound cores may also include one or more mantle layers.

The cover may be injection molded, compression molded, or cast over the core. Injection molding typically requires a mold having at least one pair of mold cavities; e.g., a first mold cavity and a second mold cavity, which mate to form a spherical recess. In addition, a mold may include more than one mold cavity pair.

In one exemplary injection molding process, each mold cavity may also include retractable positioning pins to hold the core in the spherical center of the mold cavity pair. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold (demolded).

Compression molds also typically include multiple pairs of mold cavities, each pair comprising first and second mold cavities that mate to form a spherical recess. In one exemplary compression molding process, a cover material is pre-formed into half-shells, which are placed, respectively, into each of a pair of compression mold cavities. The core is placed between the cover material half-shells and the mold is closed. The core and cover combination is then exposed to heat and pressure, which cause the cover half-shells to combine and form a full cover.

Casting processes also typically utilize pairs of mold cavities. In a casting process, a cover material is introduced into a first mold cavity of each pair. A core is then either placed directly into the cover material or is held in position (e.g., by an overhanging vacuum or suction apparatus) to contact the cover material in what will be the spherical center of the mold cavity pair. Once the cover material is at least partially cured (e.g., to a point where the core will not substantially move), the cover material is introduced into a second mold cavity of each pair, and the mold is closed. The closed mold is then subjected to heat and pressure to cure the cover material thereby forming a cover on the core.

As a common feature of injection molding, compression molding, and casting, when used to form a golf ball cover, the mold cavities typically include a negative dimple pattern to impart a dimple pattern on the cover during the molding process.

Casting is the most common method of producing a urethane or urea layer on a golf ball. However, the materials typically used in casting require a relatively long gel time. Long gel times have the disadvantage of requiring long cure times for the material to set so that the ball can be demolded, or removed from the mold. Additionally, once demolded, cast golf balls usually require subsequent buffing and other finishing process steps. Another disadvantage of using materials with a long gel time is that they may require sacrificing one or more material properties, such as flex modulus or resiliency.

Reaction Injection Molding (RIM) allows for a wider range of materials to be used in manufacturing, including materials with a short gel time. RIM, however, is subject to technical challenges, one of which is eliminating or minimizing the production of flash. Flash is extra material formed during molding or casting that must subsequently be removed. Since the materials used in RIM can have low viscosity, they readily flow into any crevices or holes within the mold. If retractable pins are used, there will necessarily be some clearance between the pins and the holes in the mold in which the pins are mounted. Thus, low viscosity layer-forming materials have not heretofore been usable with retractable pin reaction injection molding. As a result, conventional RIM has been limited to using materials having longer gel times. Otherwise, extensive and oftentimes economically prohibitive post-mold processing is required to remove the resulting flash. Furthermore, extensive labor is often required to clean and maintain the mold after retractable pin reaction injection molding.

What is needed is an improved retractable pin reaction injection molding device and method allowing for injection of materials with low viscosity.

SUMMARY OF THE INVENTION

The present invention is directed to a device and method for molding a layer on an object. The device comprises a mold including mating mold parts that cooperate to form a mold cavity. One or more retractable pins are provided to hold the object within the cavity formed by the mold parts. The pins are extendable into the cavity and retractable into holes within the mold parts. The faces of the pins, which contact core 12 in the advanced position, form a portion of the mold cavity wall when retracted. The cavity wall and the pin faces may include protrusions that cooperate to form a dimpled pattern on an outer surface of the layer. The pin faces may include less than one, one, or more than one dimple-forming protrusion thereon.

The device further comprises an injector for inserting a layer-forming material under pressure into the mold and around the object. The injector comprises at least two tanks that house components for forming the layer. The components are mixed together and then inserted into the mold. A plunger or the like may be used to control the flow of the material and components.

The device further includes a system for preventing the layer-forming material from flowing within the clearance between the mold plates and the pins. The system may be a pressurized gas system, and may include a compressor or other pressurizer to generate a counter pressure within the pin holes around the pins to counteract the material insertion pressure. An inert or diatomic gas is pressurized to provide the counter pressure. The system may include a dehumidifier to ensure no moisture is inserted by the system into the mold. The system may be pressurized to withstand a material pressure of approximately 25,000 psi.

The method of the present invention comprises providing a mold as described above. The pins are used to hold the object in known fashion, and the mold plates are mated together. The plunger is moved from an inserted position to a retracted position, allowing the layer-forming material components to enter into a chamber and mix through impingement to create the layer-forming material. The components are drawn from storage tanks and inserted into the chamber by a pressurizing cylinder. A three-way valve may be used to prevent the material from returning to the tanks. The pressurizing cylinder may be advanced to build material pressure in the injector. The layer-forming material is injected into the mold cavity and around the object. A variety of layer-forming materials, such as thermoplastics and thermosets, may be used. The material may have a viscosity of approximately 5000 cps or less, and may have a gel time of approximately one second.

The pins are retracted into the mold plates, and the material fills in the voids left by the retracted pins. The system is engaged to prevent material from entering the holes containing the pins in the mold.

The device and method of the present invention may be used to produce a golf ball product.

DESCRIPTION OF THE DRAWINGS

The present invention is described with reference to the accompanying drawings, wherein.

DETAILED DESCRIPTION OF THE INVENTION

Figure 1:
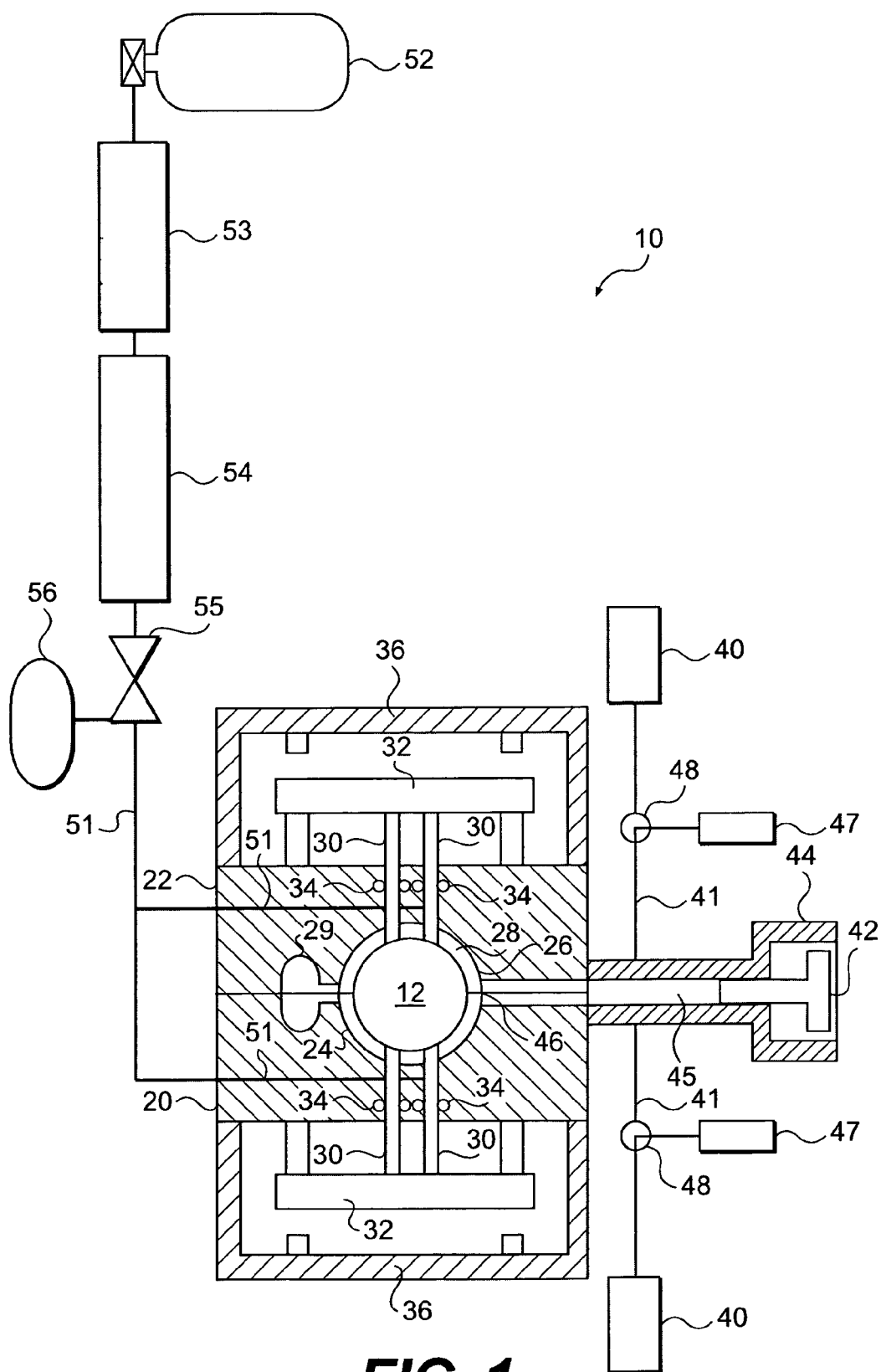
FIG. 1 illustrates a cross-sectional view of a retractable pin reaction injection molding device of the present invention.

FIG. 1 illustrates a cross-sectional view of a retractable pin reaction injection molding (RPRIM) device 10 of the present invention. Device 10 includes mold plates 20, 22 that cooperate to form a mold. Each plate 20, 22 has a hemispherical cavity 24, 26 formed therein. Cavities 24, 26 mate to form a spherical cavity 28 when mold plates 20, 22 are mated. Plates 20, 22 may also have additional cavities to cooperatively form a cavity 29, which can be used to provide an outlet for evacuation purposes. Plates 20, 22 may be arranged in a variety of orientations, but the "horizontal" orientation illustrated in FIG. 1 is a preferred orientation.

Device 10 includes one or more retractable pins 30. While four such pins 30 are illustrated in FIG. 1, different numbers of pins 30 may be used. At the initial stage of the injection molding process, a golf ball product, such as a core, 12 is placed inside the mold and is supported centrally within the mold by pins 30. While the golf ball product can be a ball at any stage of manufacturing, such as a core with one or more layers already formed thereon, the golf ball product will be discussed herein, for illustrative purposes only, as being a core. The orientation of pins 30 is variable, but a vertical layout is preferred. Pins 30 hold core 12 within the mold cavity so as to leave a space for forming an intermediate or cover layer about the core. The pins 30 are activated by plates 32 that control movement of pins 30 to engage with core 12 to hold it securely in place. Plates 32 may be actuated in a variety of manners known within the art, such as hydraulically or pneumatically. Seals 34 may be used in conjunction with pins 30 to prevent matter from entering or exiting the mold. Stops 36 may be used to limit the outward travel of plates 32.

After pins 30 have engaged with core 12, material to form a layer on core 12 is injected into the mold. The material preferably comprises two or more components mixed together. A preferred form of mixing is impingement mixing. Reservoirs such as tanks 40 house components that, upon mixing, cooperate to produce the layer-forming material. Tanks 40 are connected by flow lines 41 to a channel 45 within housing 44. Channel 45 provides a pathway for the layer-forming material into cavity 28. A plunger 42 is moveably retained within housing 44. Plunger 42 is moveable between an inserted position, in which plunger 42 covers lines 41 and prevents the material components from entering channel 45, and a retracted position, in which plunger 42 does not cover lines 41 and allows the material components to enter channel 45. Plunger 42 is illustrated in FIG. 1 in the retracted position.

The components are drawn from tanks 40 by cylinders 47 and valves 48. Valves 48 are preferably three-way valves. Cylinders 47 are opened with valves 48 oriented such that the components within tanks 40 are drawn into lines 41. Once a predetermined amount of the components have been removed from each tank 40 or once a predetermined amount of time has passed, valves 48 are reoriented to connect cylinders 47 to channel 45. Cylinders 47 are then closed, forcing the components drawn from tanks 40 into channel 45 where they mix to produce the layer-forming material. The pressure at which the components are injected into channel 45 and into the mold is dictated by the force applied by cylinders 47 and the size of the lines used. An exemplary pressure is 25,000 psi, though greater or lesser pressures may be used. Nozzles (not shown) may optionally be placed between flow lines 41 and channel 45 to assist in the impingement of the components. Pumps, such as gear pumps, can be used in place of cylinders 47. Note that, for illustrative purposes, one of valves 48 is shown in FIG. 1 as connecting tank 40 to cylinder 47, and the other valve 48 is shown as connecting channel 45 to cylinder 47.

Upon movement of plunger 42 from the inserted position to the retracted position, lines 41 become uncovered. The components impinge upon each other within channel 45 as described and mix together to produce the layer-forming material. The pressure due to cylinders 47 that forces the components into channel 45 also forces the mixed material into cavity 28. Because there is necessarily some amount of clearance around pins 30 and because of the low viscosity of the layer-forming material, material also tends to be forced within the holes within molds 20, 22 for pins 30. Typically, a plurality of edge gates 46 is used to evenly distribute the material around core 12. However, low-viscosity materials allow cavity 28 to be filled with only one edge gate 46. If only one gate 46 is used, it is preferably located at the parting line of the mold. Therefore, one or more edge gates 46 are used with the present invention.

Channel 45, either within housing 44 or within the mold or within both housing 44 and the mold, may include a number of runners and/or gate flippers, as described in U.S. Pat. No. 6,235,230, to better maintain uniform characteristics and thermal balances of the material. However, these runners and flippers may not be necessary or desirable since the material has a low viscosity. In this case, channel 45 may flow directly into the mold.

A counterpressure of gas is used prevent material from entering and fouling the holes within mold plates 20, 22 that contain pins 30. This gas may be provided by a tank 52, such as shown in FIG. 1, but may also be supplied by a pump or the like. The gas is preferably an inert gas, such as helium, or a diatomic gas, such as nitrogen. Compressed air may also be used. Lines 51 provide conduits for the gas 51 to flow into the mold. A pressurizer 53 maintains a predetermined pressure within lines 51. A dehumidifier 54 may optionally be used to remove moisture from the gas within lines 51. A valve 55 controls the flow of gas within lines 51. Valve 55 may be placed in an open position to allow flow through lines 51, in a closed position to prevent flow through lines 51, or in an intermediate position between the open and closed positions to throttle flow through lines 51. A timer 56 may optionally be included to automatically control operation of valve 55.

Lines 51 travel within mold plates 20, 22 and empty into the holes within mold plates 20, 22 that surround pins 30. Seals 34 prevent the gas from flowing out of the mold along pins 30. The gas, therefore, flows within the clearance between plates 20, 22 and pins 30, and into cavity 28.

Figure 2:
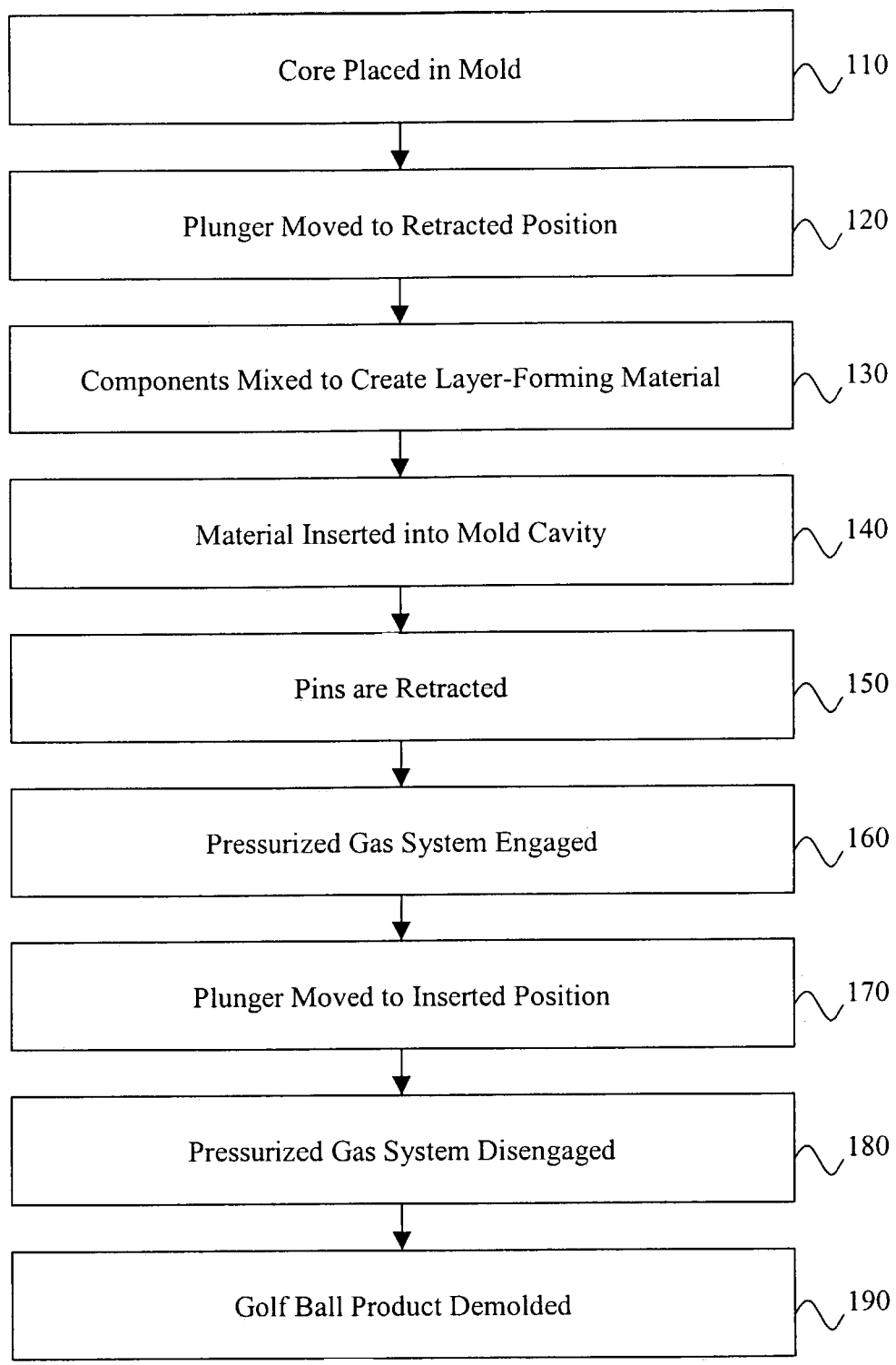
FIG. 2 illustrates a flowchart for the steps of a method of using the retractable pin reaction injection molding device of FIG. 1.

FIG. 2 illustrates a flowchart for the steps of a method of using the RPRIM device of FIG. 1. At step 110, core 12 is held by pins 30 within cavity 28 in known fashion. Components that combine to produce the layer-forming material are placed in tanks 40 and held there. At step 120, plunger 42 is moved to the retracted position, opening lines 41 into channel 45. At step 130, cylinders 47 and valves 48 are operated to draw the components from tanks 40 and inject them into channel 45. The components impinge upon each other and thereby mix. Thus, channel 45 also serves as a mixing chamber. At step 140, the material pressurized by cylinders 47 propels the now mixed material into cavity 28 within the mold. Since the material is mixed immediately before it is inserted into cavity 28, a variety of layer-forming materials may be used. For example, a thermoset material having a viscosity of approximately 5000 cps or less and a gel time of approximately 1 second, which is not usable with current systems, may be used. These materials may be selected to provide improved conditions in the finished golf ball, such as flex modulus or resiliency.

Pins 30 hold core 12 in place while the injected material fills the void between core 12 and the inside wall of cavity 28. Trapped air and gasses escape through vents (not shown) in known manner as flow of the injected material from gate(s) 46 fills the void between the core 12 and the mold. The vents are preferably located opposite gate(s) 46 on the parting line. Once the void is nearly filled but before the injected material has completely hardened, pins 30 are retracted from cavity 28 (step 150) until the faces of pins 30, which contact core 12 in the advanced position, form a portion of the mold cavity wall. If pins 30 are retracted only after the injected covering material has contacted pins 30, any voids formed from retraction of pins 30 are filled by the injected material.

The cavity wall and the pin faces may include protrusions that cooperate to form a dimpled pattern on an outer surface of the layer. The pin faces may include less than one, one, or more than one dimple-forming protrusion thereon.

At step 160, the pressurized gas system is engaged. A predetermined amount of time after the material enters cavity 28, valve 55 is opened, allowing gas within tank 52 to flow through lines 51. Dehumidifier 54 may optionally be used to ensure that no moisture is inserted into the mold by the gas. Pressurizer 53 maintains the pressure within lines 51 to a predetermined level. This predetermined level is selected such that the gas will provide a counter pressure against the material insertion pressure and allow the material to flow into cavity 28 and contact the entire surface of cavity 28, but not flow within the clearance between pins 30 and the mold. The system, therefore, allows materials with a low viscosity and a short gel time to be used without requiring post-mold flash removal and pin clearance hole cleaning. The predetermined pressure is based in part upon the injection pressure and the material properties, such as viscosity, of the layer-forming material.

The gas flows through lines 51 and possibly, at the initial stages, into cavity 28. Once enough material has entered the cavity, gas will no longer flow into cavity 28. The gas provides a counter pressure preventing the material from flowing out of cavity 28 around pins 30. The material fills cavity 28. Any excess material and/or gas will flow into cavity 29, which is designed to vent material and trapped gasses.

After a predetermined amount of material has been inserted, plunger 42 is returned to the inserted position (step 170). This prevents further components from entering into channel 45. Movement of the plunger to the inserted position also forces any material remaining within channel 45 into the mold. At step 180, the pressurized gas system is disengaged. A predetermined amount of time after plunger 42 is returned to the inserted position, valve 55 is cycled to cease the flow of gas within lines 51. A pressure-relief valve may be provided within line 51 between the valve and the mold to relieve any remaining pressure within line 51.

At step 190, after the injected material has substantially hardened, the mold is opened and the golf ball product is removed. As used herein, golf ball product refers to a golf ball at any manufacturing step. A mantle layer formed on a golf ball core and a cover layer formed on a core or mantle layer are examples of golf ball products.

The method steps do not have to be performed in the order presented. For example, the system may be engaged (step 160) before the pins are retracted (step 150) or before the material enters the cavity (step 140).

The system can also be used to provide counterpressure against the material entering the mold. When initiated just before or just after the material is injected, the system can be used to balance and control the material flow into and through the mold. The system provides an equal pressure in the mold, which negates any filling imbalances caused by, for example, thermal or viscosity differences in the material stream. In this manner, the system ensures a balanced fill throughout the mold. This may be particularly useful when using mold plates with multiple cavities.

Various materials may be used in conjunction with the RPRIM device of the present invention. For purposes of the following discussion regarding materials, the term "catalyst" should be understood by one of ordinary skill in the art to include only those compounds which facilitate, or increase the rate of, a particular reaction and which are not substantially consumed by themselves reacting with one or more of the necessary components of the particular reaction. For example, any compound containing an accessible and reactive amine, epoxy, or hydroxyl group that should readily react with an isocyanate group should be considered a reactable component (e.g., a curing agent) and not a catalyst.

As used herein, the term "fluid" includes a liquid, a paste, a gel, a gas, or any combination thereof. It should be understood that the term "fluid-filled," as used herein in reference to golf equipment or to a portion thereof, also includes the situation where the golf equipment, or the portion thereof, is hollow.

As used herein in reference to a golf ball, the term "core" represents the center and optional additional layer(s), such as an intermediate layer, which layer(s) is(are) disposed between the center and the cover of the golf ball.

The term "prepolymer," as used herein, refers to a material containing at least one isocyanate-containing component, and at least one isocyanate-reactive component, for example, such as a polyol, a polyamine, an epoxy-containing compound, and mixtures thereof.

The term "quasi-prepolymer," as used herein, refers to a subset of prepolymers in which the isocyanate content is at least about 13% of the weight of the prepolymer. Where prepolymers are mentioned herein, it should be understood that this includes prepolymers having an isocyanate content less than about 13% by weight and also includes quasi-prepolymers.

The term "polyol," as used herein, refers to a compound containing at least 2 hydroxyl groups, regardless of its molecular weight. The term "polyamine," as used herein, refers to a compound containing at least 2 primary or secondary amine groups, regardless of molecular weight.

Materials that may be used with the invention include a first reactable component including a polyisocyanate, or a prepolymer or quasi-prepolymer containing the reaction product of a polyol, polyamine, or epoxy-containing compound with at least one polyisocyanate, and a second reactable component including at least one of a polyol, polyamine, or epoxy-containing compound. The reactable components nay be mixed together to form a reactive mixture, which can be injected into a cavity or mold having a desired shape within a time sufficient to avoid substantial gelation or solidification. Advantageously, the polymerization, solidification, or gelation times of the reactive mixture of the present invention should typically not be more than about 60 seconds, preferably not more than about 45 seconds, more preferably from about 0.25 seconds to 30 seconds, most preferably from about 0.5 seconds to 15 seconds, all at ambient or elevated temperatures. In various other embodiments, the polymerization, solidification, or gelation times of the reactive mixture of the present invention are from about 1 second to 10 seconds or from about 1 second to 5 seconds. In particular, reaction injection molding can be used to form a core layer, intermediate layer, cover layer, or any portion or combination of layers thereof.

RIM, according to the invention, includes any injection molding process in which two or more components are reactive upon contact and/or addition into a mold cavity. The invention further includes several different sub-types of reaction injection molding, e.g., such as liquid injection molding (LIM), reinforced reaction injection molding (RRIM), and structural reaction injection molding (SRIM). Liquid injection molding occurs when the two or more components are in liquid form and includes subclasses micro-LIM and nano-LIM, which refer to smaller and much smaller injection volumes, respectively, as compared to most commercial processes. Reinforced RIM occurs with one or more filler materials being added to the two or more components prior to injection into the mold cavity. Structural RIM occurs where there is a preform around which the two or more components are injected within the mold cavity. The preform is generally in fiber or mesh form, but may be made from any material sufficient to substantially withstand the injection pressures typically associated with the RIM process. In SRIM, a composite material is typically formed.

In a preferred embodiment, each of the first and second reactable components have a viscosity not more than about 20,000 cPs, preferably not more than about 15,000 cPs, more preferably from about 25 cPs to 10,000 cPs, most preferably from about 25 cPs to 5,000 cPs, until the reactable components are mixed together or the reactive mixture is injected into the cavity or mold. In another preferred embodiment, all the reactable components, or mixtures thereof, that can be contacted to form the reactive mixture have viscosites similar to those of the first and second reactable components. In yet another preferred embodiment, each reactable component has a viscosity not more than about 5,000 cPs at a temperature of about 150° F. In one embodiment, the mixture is injected into the mold or cavity at an injection pressure of not more than about 2,500 psi.

The first, or isocyanate-containing, reactable component can include any isocyanate-functional monomer, or a dimeric or multimeric adduct thereof, prepolymer, quasi-prepolymer, or mixture thereof. The isocyanate-functional compounds may include monoisocyanates or polyisocyanates, which include any isocyanate functionality of two or more. Any polyisocyanate available to one of ordinary skill in the art is suitable for use according to the invention.

Suitable isocyanate-containing components include diisocyanates having the generic structure:

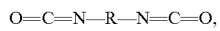

where R is preferably a cyclic, aromatic, or linear or branched hydrocarbon moiety containing from about one to twenty carbon atoms. The diisocyanate may also contain one or more phenyl groups or one or more cyclic groups. When multiple aromatic or cyclic groups are present, linear and/or branched hydrocarbons containing from about one to ten carbon atoms can be present as spacers between the aromatic or cyclic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens; primary, secondary, or tertiary hydrocarbon groups, or a mixture thereof. Other suitable isocyanate-containing compounds or the polyisocyanates include higher functional adducts of the above diisocyanates, as well as triisocyanates and higher functional isocyanates that are not adducts of diisocyanates, and mixtures thereof. Exemplary polyisocyanates include, but are not limited to, straight or branched aliphatic diisocyanates containing from about two to forty carbons, for example, such as ethylene diisocyanate, propylene isocyanates (e.g., such as propylene-1,2-diisocyanate), tetramethylene isocyanates (e.g., such as tetramethylene-1,4-diisocyanate), hexamethylene diisocyanates (e.g., such as 1,6-hexamethylene diisocyanate (HDI), 2,2,4-trimethylhexamethylene diisocyanate (TMDI), and the like), dodecane-1,12-diisocyanate, 2,2,4-trimethylhexamethylene diisocyanate, 4,4'-dicyclohexylmethane diisocyanate ($H_{12}$MDI), 2,4,4-trimethylene diisocyanate, and the like; diisocyanates containing cyclic groups, for example, such as cyclobutane-1,3-diisocyanate, cyclohexyl diisocyanates (e.g., such as cyclohexane-1,3-diisocyanate, cyclohexane-1,4-diisocyanate-, methyl cyclohexylene diisocyanate ($H_6$XDI), 1-isocyanato-3,3,5-trimethyl-5-isocyanatomethyl cyclohexane, isophorone diisocyanate (IPDI), and the like); diisocyanates containing aromatic groups, for example, such as 4,4'-diphenylmethane diisocyanate (MDI), polymeric MDI, carbodiimide-modified liquid MDI, p-phenylene diisocyanate (PPDI), m-phenylene diisocyanate (MPDI), toluene diisocyanate (TDI), 3,3'-dimethyl-4,4'-biphenylene diisocyanate (TODI), naphthalene diisocyanate (NDI), xylylene diisocyanate (XDI), para-tetramethylxylylene diisocyanate (p-TMXDI), meta-tetramethylxylylene diisocyanate (m-TMXDI), tetracene diisocyanate, napthalene diisocyanate, anthracene diisocyanate, and the like; trimerized isocyanurates of any polyisocyanate or mixtures thereof, for example, such as the isocyanurate of TDI, the isocyanurate of a hexamethylene diisocyanate, and the like; dimerized uretdiones of any polyisocyanate or mixtures thereof, for example, such as the uretdione of TDI, the uretdione of a hexamethylene diisocyanate (e.g., such as HDI and the like), and the like; and mixtures thereof. Polyisocyanates are known to those of ordinary skill in the art as having more than one isocyanate group, e.g., di-, tri-, and tetra-isocyanate. Preferably, the polyisocyanate includes MDI, PPDI, MPDI, TDI, or a mixture thereof. In one preferred embodiment, the polyisocyanate includes MDI. In one embodiment, the polyisocyanate is completely free of m-TMXDI. It should be understood that, as used herein, the term "MDI" includes 4,4'-diphenylmethane diisocyanate, polymeric MDI, carbodiimide-modified liquid MDI, and mixtures thereof.

Typically, the amount of the isocyanate-containing reactable component is determined in relation to the amount of the second reactable component present in the reactive mixture. In one preferred embodiment, the ratio of the first isocyanate-containing reactable component to the second, or isocyanate-reactive, reactable component is typically from about 0.02:1 to 10:1, preferably from about 2:1 to 1:2, more preferably from about 1.5:1 to 1:1.5, most preferably from about 1.1:1 to 1:1.1.

In one embodiment, the first isocyanate-containing reactable component should have less than about 14% by weight unreacted NCO groups, based on the weight of the isocyanate-containing reactable component. In another embodiment, the first isocyanate-containing reactable component has no greater than about 7.5%, more preferably from about 2.5% to 7.5%, and most preferably from about 4% to 6.5% by weight unreacted NCO groups, based on the weight of the first isocyanate-containing reactable component. In yet another embodiment, the first isocyanate-containing reactable component should have greater than about 14% by weight unreacted NCO groups, based on the weight of the isocyanate-containing reactable component.

The first isocyanate-containing reactable component employed may be "low free monomer," understood by one of ordinary skill in the art to have lower levels of "free" monomer isocyanate groups, typically less than about 0.1% free isocyanate-containing monomer groups. Typically, polymer products containing low free monomer isocyanates are less toxic, exhibit improved elastomeric properties, and/or result in a more uniform polymer. Examples of "low free monomer" isocyanates include, but are not limited to, Low Free Monomer MDI, Low Free Monomer TDI, and Low Free Monomer PPDI, as well as mixtures thereof.

Preferably, the second reactable component includes at least one polyamine, polyol, epoxy-containing compound, or a mixture thereof. In one preferred embodiment, the second reactable component includes at least one polyamine. Suitable polyamines include, but are not limited to, tetrahydroxypropylene ethylenediamine; 3,5-dimethylthio-2,4-toluenediamin-e and isomers thereof, for example, such as 3,5-dimethylthio-2,6-toluenedi-amine or ETHACURE™ 300, commercially available from Albermarle Corporation of Baton Rouge, La.; 3,5-diethyltoluene-2,4-diamine and isomers thereof, such as 3,5-diethyltoluene-2,6-diamine; 1,4-bis-(sec-butylamino)-benzene and isomers thereof, for example, such as 1,2-bis-(sec-butylamino)-benzene; 1,2-bis-(sec-butylamino)-cyclohexane and isomers thereof, for example, such as 1,4-bis-(sec-butylamino)-cycloh-exane; 4,4'-bis-(sec-butylamino)-diphenylmethane and derivatives thereof; 4,4'-bis-(sec-butylamino)-dicyclohexylmethane and derivatives thereof; trimethylene glycol di-p-aminobenzoate; polytetramethyleneoxide-di-p-amin-obenzoate; N,N'-dialkyldiamino diphenyl methane; p,p'-methylene dianiline (MDA); m-phenylenediamine (MPDA); 4,4'-methylene-bis-(2-chloroaniline-) (MOCA); 4,4'-methylene-bis-(2,6-diethylaniline); 4,4'-methylene-bis-(3-chloro-2,6-diethylaniline); 4,4'-diamino-3,3'-dieth-yl-5,5'-dimethyl diphenylmethane; 2,2',3,3'-tetrachloro-diamino diphenylmethane; 4,4'-dicyclohexylmethane diamine; m- or p-phenylenediamine; 1,4-cyclohexyl-bis-(methylamine) and isomers thereof, for example, such as 1,4-cyclohexyl-bis-(methylamine); 2-methylpenatmethylene diamine; diaminocyclohexane; triisopropanolamine; diethylene triamine; triethylamine tetramine; tetraethylene pentamine; isomers of propylenediamine, for example, such as 1,3-propylenediamine; dialkylaminopropylamines, for example, such as dimethylaminopropylamine, diethylaminopropylamine, and the like, and mixtures thereof; imido-bis-propylamine; diethanolamine; triethanolamine; diisopropanolamine; isophoronediamine; and mixtures thereof. Suitable polyamines, which can include both primary and secondary amines, preferably have molecular weights ranging from about 64 to 4,000 g/mol.

Other suitable polyamines include those having the general formula:

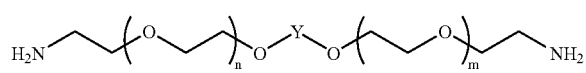

where n and m each separately have values of 0, 1, 2, or 3, and where Y is preferably 1,2-cyclohexyl, 1,3-cyclohexyl, 1,4-cyclohexyl, o-, m-, or p-phenylene, or the like, or a combination thereof. Preferably, n and m each separately have values of 0, 1, or 2, more preferably 1 or 2.

In an alternate preferred embodiment, the second reactable component includes a polyol. Any polyol, or mixture thereof, available to one of ordinary skill in the art is suitable for use with the invention. In a more preferred embodiment, the polyol includes ethylene glycol; diethylene glycol; propylene glycol; dipropylene glycol; a polyether polyol, for example, such as polyethylene glycol, polypropylene glycol, polytetramethylene ether glycol ($M_n \leq$ about 4,000 g/mol), and the like, and mixtures thereof; 1,3-bis(2-hydroxyethoxy)benzene; 1,3-bis-[2-(2-hydroxyethoxy)ethoxy]benzene; 1,3-bis-{2-[2-(2-hydroxyet-hoxy)ethoxy]ethoxy}benzene; 1,3-butanediol and isomers thereof, for example, such as 1,4-butanediol, 2,3-butanediol, and the like, and mixtures thereof; 1,5-pentanediol; 1,6-hexanediol; ortho-phthalate-1,6-hexanediol; resorcinol-di-(β-hydroxyethyl)ether and its derivatives; hydroquinone-di-(β-hydroxyethyl)ether and its derivatives; trimethylol propane; hydroxy-terminated polybutadiene (including partially/fully hydrogenated derivatives); a polyester polyol, for example, such as a polycaprolactone polyol; polycarbonate polyol; or a mixture thereof.

When the polyol includes a polyether polyol, preferably those polyols that have the generic structure:

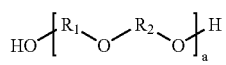

where $R_1$ and $R_2$ are straight or branched hydrocarbon chains, each containing from one to about twenty carbon atoms, and n ranges from one to about forty-five. Examples include, but are not limited to, polytetramethylene ether glycol (PTMEG), polyoxyethylene glycol (PEG), polyoxypropylene glycol (PPG), poly(oxyethylene-oxypropylene) g-lycol copolymers, and mixtures and copolymers thereof. The hydrocarbon chain can have saturated or unsaturated bonds and substituted or unsubstituted aromatic and cyclic groups. In a preferred embodiment, the polyol of the present invention includes PTMEG.

When polyester polyols are included in the polyurethane material of the invention, preferably those polyols that have the generic structure:

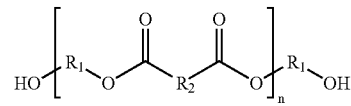

where $R_1$ and $R_2$ are straight or branched hydrocarbon chains, each containing from one to about twenty carbon atoms, and n ranges from one to about twenty-five. Suitable polyester polyols include, but are not limited to, polyethylene adipate glycol, polypropylene adipate glycol, polybutylene adipate glycol, poly(ethylene adipate-propylene adipate)glycol, poly(hexamethylene adipate)glycol, and mixtures and copolymers thereof. The hydrocarbon chain can have saturated or unsaturated bonds, or substituted or unsubstituted aromatic and cyclic groups.

In an alternate preferred embodiment, the polyester polyol can include a polycyclic ester polyol, for example, such as a polycaprolactone polyol. When polycaprolactone polyols are included in the materials of the invention, preferably those polyols that have the generic structure:

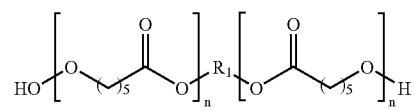

where $R_1$ is preferably a straight chain or branched hydrocarbon chain containing from one to about twenty carbon atoms, and where n is the chain length and ranges from one to about twenty. Suitable polycaprolactone polyols include, but are not limited to, 1,6-hexanediol-initiated polycaprolactone, diethylene glycol-initiated polycaprolactone, trimethylol propane-initiated polycaprolactone, neopentyl glycol-initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

When polycarbonate polyols are included in the polyurethane material of the invention, preferably those polyols that have the generic structure:

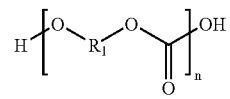

where $R_1$ can include a hydrocarbon chain, which may have saturated or unsaturated bonds or substituted or unsubstituted aromatic or cyclic groups (e.g., in one preferred embodiment, $R_1$ includes predominantly bisphenol A units -(p-$C_6H_4$)—C($CH_3$)$_2$-(p-$C_6H_4$)— or derivatives thereof), and where the chain length, n, ranges from one to about twenty. Suitable polycarbonates include, but are not limited to, poly(phthalate carbonate)glycol, poly(hexamethylene carbonate)glycol, polycarbonate glycols containing bisphenol A, or mixtures or copolymers thereof.

Other suitable polyols have the following general chemical structure:

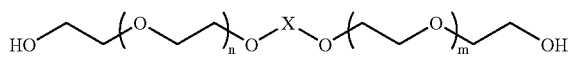

where n and m each separately have values of 0, 1, 2, or 3, and where X is o-phenylene, m-phenylene, p-phenylene, 1,2-cyclohexyl, 1,3-cyclohexyl, or 1,4-cyclohexyl, or mixtures thereof. Preferably, n and m each separately have values of 0, 1, or 2, and more preferably, 1 or 2.

In one embodiment, the second reactable component contains a compound having a molecular weight of at least about 400 g/mol, alternately from about 200 g/mol to about 4000 g/mol. In another embodiment, the second reactable component contains a compound having a molecular weight of not more than about 400 g/mol, alternately from about 18 g/mol to 600 g/mol. In a preferred embodiment, the second reactable component contains at least two compounds, a first compound having a molecular weight of not less than about 400 g/mol, alternately from about 200 g/mol to about 4000 g/mol, and a second compound having a molecular weight of not more than about 400 g/mol, alternately from about 18 g/mol to 600 g/mol. It should be understood that molecular weight, as used herein, is the absolute number average molecular weight and would be understood as such by one of ordinary skill in the art.

Generally, when the second reactable component contains a compound whose molecular weight is not less than about 400 g/mol, this reactable component is considered the "soft segment" of the resulting polymer material. Preferably, the soft segment is present in an amount from about 40% to 95%, preferably from about 50% to 90%, more preferably from about 60% to 85%, based on the total weight of the polymer.

Epoxy-containing compounds according to the present invention have the general formula:

wherein $R_1$ and $R_2$ can be the same or different and each represent a hydrogen atom or an organic group including linear and branched chain alkyl, aryl, hydrocarbyloxy, and carbocyclic groups, and mixtures thereof. In a preferred embodiment, both $R_1$ and $R_2$ are generally not hydrogen atoms.

As used herein, the phrase linear chain or branched chained alkyl groups of up to about thirty carbon atoms means any substituted or unsubstituted acyclic carbon-containing compounds. Examples of alkyl groups include lower alkyl, for example, methyl, ethyl, n-propyl, iso-propyl, n-butyl, iso-butyl or tert-butyl; and upper alkyl.

In addition, such alkyl group may also contain various substituents in which one or more hydrogen atoms has been replaced by a functional group. Functional groups include but are not limited to hydroxyl, amino, carboxyl, amide, ester, ether, halogen (fluorine, chlorine, bromine and iodine), siloxanes, and sulfonic amides to mention but a few.

As used herein, substituted and unsubstituted carbocyclic groups of up to about twenty carbon atoms means cyclic carbon-containing compounds, including but not limited to cyclopentyl, cyclohexyl, and a combination thereof.

A preferred class of epoxy-containing compounds for the present invention includes organic compounds having two epoxy groups as shown in the formula below:

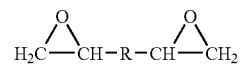

wherein R is defined as for $R_1$ and $R_2$ above.

The most preferred diepoxy compound for use in the second reactive component of the present invention is (2,2-bis[4-(2'3'epoxy propoxy)phenyl]propane), commonly called the diglycidyl ether of bisphenol A (DGEBA) and having the following formula:

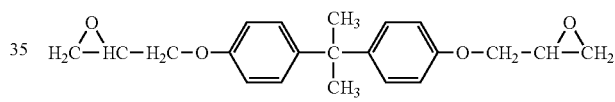

The other curing agents, related to DGEBA may also be used in the present invention. The higher molecular weight homologs are represented by the following theoretical structure having the following formula:

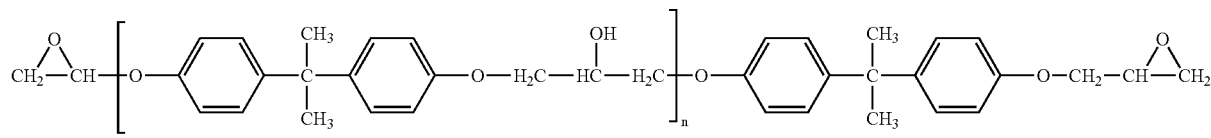

Typical values of n can be from 0.5 to about 2.5 and is about 0.15 for D.E.R. 331 epoxy resin (epoxy equivalent weight range of about 182 to 192 and viscosity of 11,000–14,000 cPs). The low melting point solid resins begin at an "n" of about 2.5. In high melting point solid resins, n may be as high as 18.

Other organic compounds having at least one epoxy group which, according to the claimed invention, can be used in one of the reactable components include the epoxy-novolac resins under the trade name D.E.N. (400 series), such as D.E.N. 431, D.E.N. 438 and D.E.N. 439, available from Dow Chemical Co. Further, low viscosity polyglycol epoxy resins under the trade name D.E.R. (700 series), including D.E.R. 732 and D.E.R. 736 may also be used. Also, the EPON™ class of epoxy resin available from Shell can also be used in the golf equipment or methods according to the present invention.

The polyols, polyamines, and epoxy-containing compounds can include one or more saturated, unsaturated, aromatic, and cyclic groups. Additionally, the polyols, polyamines, and epoxy-containing compounds can include one or more halogen groups. Also, a single polyol, polyamine, or epoxy-containing compound may be used, as well as a blend or mixture thereof.

In some embodiments, catalysts may optionally be used to accelerate or facilitate the reaction between the isocyanate-containing component and the isocyanate-reactive component, e.g., the polyol, polyamine, or epoxy-containing component. The catalyst may be contained separately from all other components or may be added to one or more other components to form a mixture. In one embodiment, the catalyst is added to the isocyanate-containing component. In another embodiment, the catalyst is added to the isocyanate-reactive component. Suitable catalysts include, but are not limited to, tin catalysts, for example, such as dibutyltin dilaurate; amine catalysts, for example, a trialkylamine such as triethylenediamine, triethylamine, tributylamine, or a mixture thereof; organic acids, for example, such as acetic acid, oleic acid, or a mixture thereof; delayed catalysts, for example, such as POLYCAT™ SA-1, POLYCAT™ SA-102, and the like, or a mixture thereof; or combinations thereof. When a catalyst is present, it is added in an amount sufficient to catalyze or facilitate the reaction of the components in the reactive mixture, preferably in an amount from about 0.001% to 3%, based on the total weight of the first and second reactable components.

Fillers added to one or more layers of the golf equipment, e.g., a golf ball, typically include processing aids or compounds to affect rheological and mixing properties, the specific gravity (i.e., density-modifying fillers), the modulus, the tear strength, reinforcement, and the like. A density adjusting filler may be used to control the moment of inertia, and thus the initial spin rate of the ball and spin decay. Fillers are typically polymeric or inorganic in nature, and, when used, are typically present in an amount from about 0.1 to 50 weight percent of the layer or portion in which they are included. Any suitable filler available to one of ordinary skill in the art may be used. Exemplary fillers include, but are not limited to, precipitated hydrated silica; clay; talc; glass fibers; aramid fibers; mica; calcium metasilicate; barium sulfate; zinc sulfide; lithopone; silicates; silicon carbide; diatomaceous earth; carbonates such as calcium carbonate and magnesium carbonate; metals such as titanium, tungsten, aluminum, bismuth, nickel, molybdenum, iron, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, and cellulose flock; micro balloons such as glass and ceramic; fly ash; cured, ground rubber; or combinations thereof.

Other additive ingredients such as accelerators, e.g., tetramethylthiuram, processing aids, processing oils, plasticizers, colorants, e.g., dyes and pigments, as well as other additives well known to the ordinary-skilled artisan may also be used in the present invention in amounts sufficient to achieve the purpose for which they are typically used.

In an alternate embodiment, each component may include at least two sets of precursor components that can be reacted to form at least two different polymers of an interpenetrating polymer network, at least one polymer being crosslinked. In addition, if any of the at least two component sets include a mixture of precursor components, then that mixture must be sufficiently non-reactive such that the sets of precursor components, when placed in contact with each other, can still form an interpenetrating polymer network (IPN). Additional descriptions of IPN compositions useful for golf equipment, or components thereof, according to the invention include those described in copending U.S. patent application Ser. No. 09/833,667, entitled "Golf Balls Containing Interpenetrating Polymer Networks," to M. Kuntimaddi et al., the disclosure of which is incorporated herein by express reference.

In one embodiment, the formed golf ball product may optionally include a foamed material. This foamed material may advantageously be made using the materials as detailed herein. Suitable components of the foamed material may include those described in U.S. Pat. No. 6,386,992, entitled "Golf Ball Compositions Including Microcellular Materials and Methods for Making Same," to K. Harris et al., the disclosure of which is incorporated herein by reference. For example, an IPN can be foamed and used to form a golf ball product, or a portion thereof. In addition, when the formed golf ball product includes a foamed material, the curing agent components may also include water.

Also when the golf ball product contains multiple layers, for example, such as in a multi-layer golf ball, a surface treatment between any two layers may be effected to improve the adhesion between those layers. The surface treatment may include mechanical abrasion, e.g., such as sandblasting; plasma treatment, including treatment at atmospheric pressure; corona treatment; flame treatment; wet chemical surface modification; application of adhesives or adhesion promoters, e.g., such as those available commercially as EASTMAN 343-1, EASTMAN 343-3, EASTMAN 515-2 (all from Eastman Chemical Co. of Kingsport, Tenn.), BAYER 8173, BAYER U42, BAYER U53, BAYER 140AQ (all from Bayer Corp. of Pittsburgh, Pa.), RICOBOND (from Ricon Resins, Inc. of Grand Junction, Colo.), WIT-COBOND (from Witco Corp. of Greenwich Conn.), or the like, or a combination thereof. Advantageously, the surface treatment may be effected as recited in U.S. Pat. No. 6,315,915, entitled "Treatment for Facilitating Bonding Between Golf Ball Layers and Resultant Golf Balls," to E. Hebert et al., the disclosure of which is incorporated herein by reference.

The resultant golf balls prepared according to the invention typically will have dimple coverage greater than about 60 percent, preferably greater than about 65 percent, and more preferably greater than about 70 percent. Optionally, the golf balls also have a cover material hardness from about 15 Shore A to 85 Shore D, or a flexural modulus (measured according to ASTM D6272-98) of greater than about 500 psi (3.4 MPa). In some cases, the flexural modulus of the reaction injection molded golf ball product, or portion thereof, can be less than about 5000 psi (34 MPa). In other cases, the flexural modulus of the reaction injection molded golf ball product, or portion thereof, can be less than about 300,000 psi (2.1 GPa). The golf balls also typically have a coefficient of restitution of greater than about 0.7, preferably greater than about 0.75, and more preferably greater than about 0.78, at an initial velocity of 125 ft/s. The golf balls also typically have an Atti compression of at least about 40, preferably from about 50 to 120, more preferably from about 60 to 100.

The disclosure of U.S. patent application Ser. No. 09/833,598, entitled "Reaction Injection Moldable Compositions, Methods for Making Same, and Resultant Golf Articles," to S. Wu et al., is incorporated herein by reference.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. For example, while the method and apparatus of the present invention have been described above as forming a golf ball product, the present invention can be used to form layers on other objects. Thus the present invention should not be limited by the above-described exemplary embodiments, but should be defined only in accordance with the following claims and their equivalents.

What is claimed is:

1. A method for molding a layer on an object, comprising:
   providing a mold including mating mold parts and one or more retractable pins for holding the object within a cavity formed by said mold parts, said pins being extendable into said cavity and retractable into holes within said mold parts;
   holding the object within said cavity with said one or more retractable pins;
   providing a material to form the layer;
   inserting said material into said mold cavity and around the object;
   retracting said pins within said holes; and
   preventing said material from flowing into said holes around said pins by providing a counterpressure within said holes.

2. The method of claim 1, wherein said inserting includes mixing two or more components to form said material.

3. The method of claim 2, wherein said mixing includes impingement mixing said components by injecting said components into a chamber under pressure.

4. The method of claim 1, wherein said injecting includes injecting said components into said chamber at a pressure of at least approximately 200 psi.

5. The method of claim 1, wherein said providing a material includes providing a thermoplastic material.

6. The method of claim 1, wherein said providing a material includes providing a thermoset material.

7. The method of claim 1, wherein said retracting includes retracting said pins a predetermined amount of time after inserting said material into said cavity.

8. The method of claim 1, wherein said preventing includes providing a pressurized gas system.

9. The method of claim 8, further comprising using said pressurized gas system to balance said inserting.

10. The method of claim 1, wherein said providing a material includes providing a material having a viscosity of approximately 5000 cps or less.

11. The method of claim 1, wherein said providing a material includes providing a material having a gel time of approximately one second.

12. The method of claim 1, wherein said preventing takes place after said retracting.

13. The method of claim 1, wherein said preventing takes place before said retracting.

14. The method of claim 1, wherein said preventing includes initiating said counterpressure after said retracting.

15. The method of claim 14, further comprising:
    disengaging said counterpressure; and
    removing the molded object from said mold after said disengaging.

* * * * *